United States Patent [19]

Okami

[11] Patent Number: 5,312,855
[45] Date of Patent: May 17, 1994

[54] ADHESIVE ORGANOPOLYSILOXANE COMPOSITION

[75] Inventor: Takehide Okami, Annaka, Japan

[73] Assignee: Shin-Etsu Chemical Co., Ltd., Tokyo, Japan

[21] Appl. No.: 11,832

[22] Filed: Feb. 1, 1993

Related U.S. Application Data

[63] Continuation of Ser. No. 616,568, Nov. 21, 1990, abandoned.

[30] Foreign Application Priority Data

Nov. 22, 1989 [JP]  Japan .................. 1-303571

[51] Int. Cl.$^5$ .................................. C08K 5/09
[52] U.S. Cl. ........................ 524/290; 524/294; 524/296; 524/298; 524/311; 524/730; 524/731; 524/775; 524/773
[58] Field of Search ............ 524/730, 731, 775, 773, 524/290, 294, 296, 298, 311

[56] References Cited

U.S. PATENT DOCUMENTS

| | | | |
|---|---|---|---|
| 5,006,580 | 4/1991 | Kasuya et al. | 524/730 |
| 5,064,891 | 11/1991 | Fujiki et al. | 524/731 |
| 5,104,919 | 4/1992 | Okami et al. | 524/94 |
| 5,120,810 | 6/1992 | Fujiki et al. | 534/730 |

*Primary Examiner*—Melvyn I. Marquis
*Attorney, Agent, or Firm*—Oblon, Spivak, McClelland, Maier & Neustadt

[57] ABSTRACT

The adhesive organopolysiloxane composition contains a compound having two or more allyl ester groups in combination with an adhesion imparting agent of a silicon compound having at least one group selected from the group consisting of an alkoxy group and an epoxy containing hydrocarbon group and also having at least one silicon-bonded hydrogen atom. This composition is markedly improved in adhesion to various substrates and durability of the adhesion.

1 Claim, 1 Drawing Sheet

ADHESIVE ORGANOPOLYSILOXANE COMPOSITION

This application is a continuation of application Ser. No. 07/616,568, filed on Nov. 21, 1990, now abandoned.

BACKGROUND OF THE INVENTION

1. Field of the Invention

This invention relates to an addition curable adhesive organopolysiloxane composition.

2. Description of the Prior Art

Addition curable adhesive compositions comprising an organopolysiloxane having a silicon-bonded vinyl group as the principal agent have been known in the art, but these compositions are not still insufficient in adhesiveness, and have drawbacks such that the cured product may be peeled off from the substrate in, for example, impregnation potting for coating electrical parts, etc.

For the purpose of eliminating such drawbacks, it has been proposed to use various adhesion imparting agents (Japanese Patent Publication (KOKOKU) Nos. 13508/1978, 21026/1978, 5219/1974).

However, in the prior arts as mentioned above, although adhesion performance may be improved to some extent, its adhesion durability is still insufficient, and if the adhered product is maintained under severe conditions such as in water, etc., peep-off will frequently occur.

Therefore, an object of the present invention is to provide an addition curable adhesive organopolysiloxane composition improved markedly in adhesion durability.

The present invention has successfully improved markedly adhesion durability by use of a compound having two or more allyl ester groups in its molecule for compositions known in the art.

More specifically, the addition curable adhesive organopolysiloxane composition comprises:

(A) 100 parts by weight of an organopolysiloxane having at least two alkenyl group in its molecule and a viscosity at 25° C. of 100 to 200,000 cSt, (B) an organohydrogenpolysiloxane having two or more silicon-bonded hydrogen atoms in its molecule in such an amount as to supply 0.6 to 6.0 silicon-bonded hydrogen atoms per alkenyl group of said (A) organopolysiloxane, (C) a catalytic amount of a platinum catalyst, (D) 0.5 to 20 parts by weight of an adhesion imparting agent comprising a silicon compound having at least one group selected from the group consisting of an alkoxy group and an epoxy containing hydrocarbon group and also having one or more silicon-bonded hydrogen atoms in one molecule, and (E) 0.05 to 5 parts by weight of a compound containing two or more allyl ester groups in its molecule.

The adhesive organopolysiloxane composition of the present invention can be adhered alone easily and firmly to not only metals but also to various plastics such as polyethylene terephthalate, polybutylene terephthalate, phenol resin, epoxy resin, etc., and yet adhesion durability is markedly improved.

Therefore, in accordance with the present invention, it has become possible to apply an addition curable adhesive organopolysiloxane composition to extremely wide various uses.

DETAILED DESCRIPTION OF THE PREFERRED EMBODIMENTS

(A) Organopolysiloxane

Figure 1:
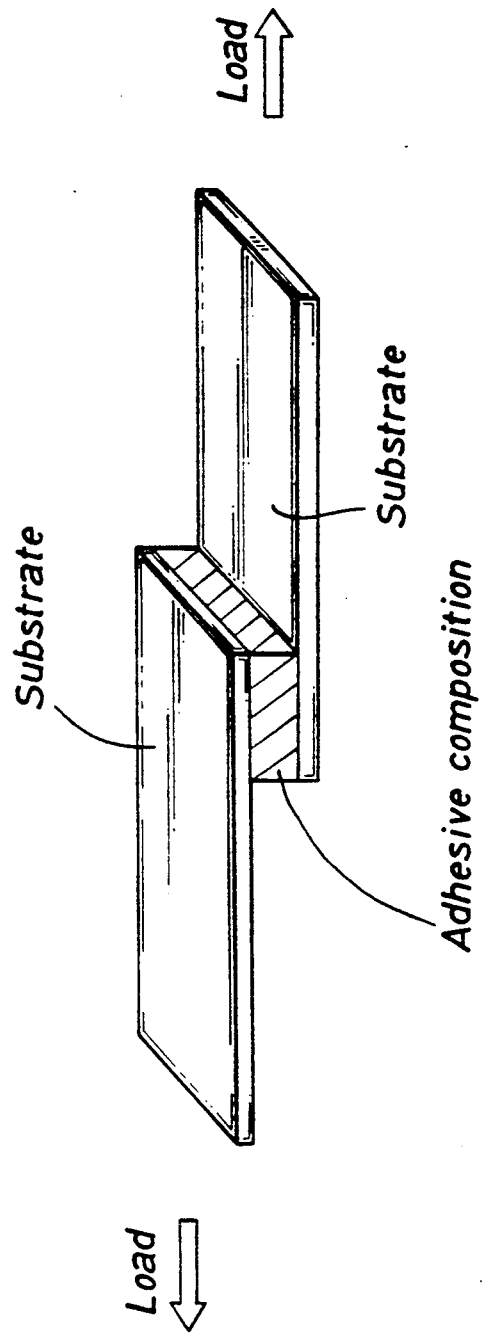
FIG. 1 shows the method for measuring the adhesive strength under shear employed in Examples.

The organopolysiloxane to be used as the principal agent in the present invention has at least 2 alkenyl groups in its molecule, and also has a viscosity at 25° C. ranging from 100 to 200,000 cSt. In this case, the alkenyl group can be exemplified by vinyl group, allyl group, 2-methyl-2-propenyl group, hexenyl group and the like. These alkenyl groups may be present either at the ends of molecular chain and/or in the course therebetween. Also, as other organic groups than alkenyl groups, there may be included unsubstituted or substituted monovalent hydrocarbon groups having generally 1 to 10 carbon atoms, preferably 1 to 8 carbon atoms, including alkyl groups such as methyl, ethyl, propyl, butyl groups and the like; aryl groups such as phenyl, tolyl groups and the like; aralkyl groups such as benzyl, 2-phenylethyl groups and the like; and corresponding substituted hydrocarbon groups in which a part or all of the hydrogen atoms have been substituted with halogen atoms, etc., including, e.g., chloromethyl, trifluoropropyl groups, etc.

Preferably, the structure of the organopolysiloxane is basically linear. Specific examples of such organopolysiloxanes may include those as shown below.

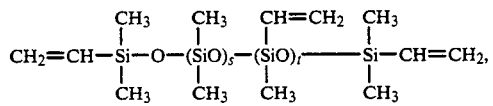

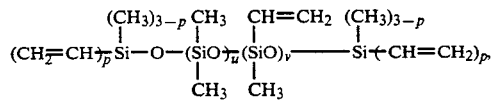

and

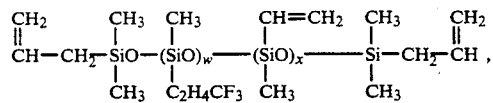

provided that, in the above formulas, p represents 2 or 3, s, u and w each represent positive integers, and t, v and x represent 0 or positive integers; more specifically, for example, these are integers such that $s+u$, $u+v$ and $w+x$ respectively range from 50 to 2,000.

The organopolysiloxane as described above may be used either singly or in combination of two or more. The molecule is preferably linear as described above, but may be partially branched.

(B) Organohydrogenpolysiloxane

In the present invention, the organohydrogenpolysiloxane of the component (B) acts as a crosslinking agent for the above-described organopolysiloxane (A). The component (B) has 2 or more silicon-bonded hydrogen atoms in one molecule. The organosiloxane (B) may have a structure which may be either straight, branched or cyclic, and also may be a mixture of these. Specific examples may include those shown below.

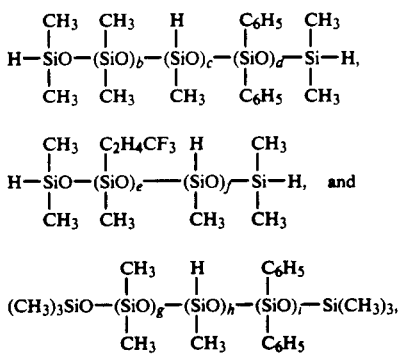

provided that, in the above formulas, b, c, d, e, f, g and i each represent 0 or positive integers, and h represents an integer of 2 or more; more specifically, for example, these are integers such that b+c+d, e+f and g+h+i respectively range from 0 to 300, preferably from 1 to 200.

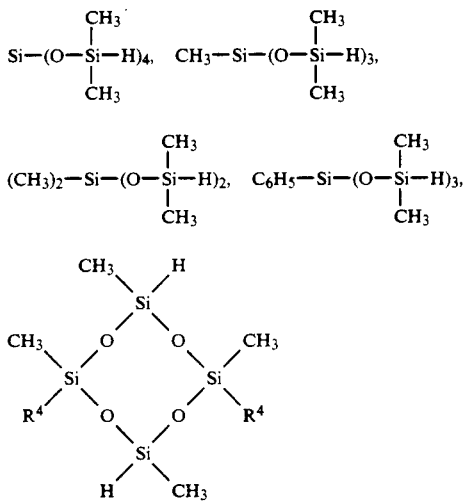

wherein $R^4$ represents a hydrogen atom, methyl group, propyl group or trimethylsiloxy group, and

$$[H(R^5)_2SiO_{\frac{1}{2}}]_l(SiO_2)_m$$

wherein $R^5$ is a monovalent $C_{1-8}$ hydrocarbon group, l and m are positive numbers which satisfy $l+m=1$.

The organohydrogenpolysiloxane of the component (B) is used in an amount enough to supply 0.6 to 6.0 silicon-bonded hydrogen atoms per alkenyl group contained in the above-described organopolysiloxane (A), preferably in an amount such that the molar ratio of ≡Si—H groups to alkenyl groups may be 1.2 to 4.0.

(C) Platinum Catalyst

The platinum catalyst to be used in the present invention is a catalyst for addition reaction and acts as a curing accelerator.

Non-limiting examples of such catalyst may include platinum black, solid platinum supported on a carrier such as alumina and silica, chloroplatinic acid, alcohol-modified chloroplatinic acid, complexes of chloroplatinic acid with a olefin, complexes of platinum with vinyl-siloxane, etc.

When the catalyst is a solid catalyst, it may be preferably finely divided for improvement of dispersibility. The carrier preferably has a small particle size and a large specific surface area. The chloroplatinic acid or the complex of chloroplatinic acid with an olefin, should be desirably employed as a solution dissolved in a solvent such as alcohol, ketone, ether or hydrocarbon type, etc.

The catalyst may be used in the so-called catalytic amount, so that the desired curing rate can be obtained. From economical standpoint or for obtaining good cured product, it may be preferably used at a ratio as described below. That is, catalysts compatible with siloxane component such as chloroplatinic acid, may be preferably used in an amount of 0.1 to 100 ppm (in terms of platinum) based on the total amount of the organopolysiloxanes of the above-described components (A) and (B); while solid catalysts such as platinum black, etc. may be preferably within the range from 20 to 500 ppm (in terms of platinum).

(D) Adhesion Imparting Agent

In the present invention, as an adhesion imparting agent, a silicon compound having at least one group selected from the group consisting of an alkoxy group and an epoxy group containing hydrocarbon group, and also having one or more silicon-bonded hydrogen atoms in its molecule is employed. This compound acts so as to improve self-adhesiveness to a substrate. The adhesion imparting agent of such a silicon compound is known per se, and there may be preferably employed, for example, those having alkoxysiloxy groups disclosed in Japanese Patent Publication (KOKOKU) No. 21026/1978, those having an epoxy containing hydrocarbon group disclosed in Japanese Patent Publication (KOKOKU) No. 13508/1978, those having an alkoxysiloxy group and epoxy containing hydrocarbon groups disclosed in Japanese Patent Publication (KOKOKU) No. 5219/1984, etc. More specifically, the following non-limiting silicon compounds can be exemplified.

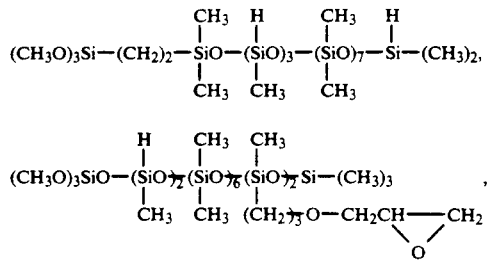

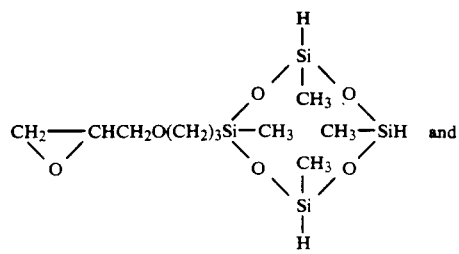

-continued

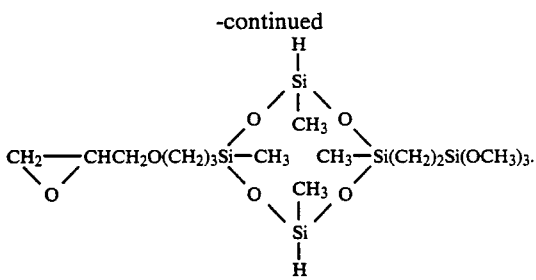

These can be also used by suitably increasing polymerization degree, etc. depending on uses.

The adhesion imparting agent as described above may be used in an amount of 0.5 to 20 parts by weight, preferably 1 to 10 parts by weight, per 100 parts by weight of the organopolysiloxane of the component (A). If the amount used is less than 0.5 part by weight, self-adhesiveness becomes poorer, while if it is used in a larger amount than 20 parts by weight, not only economical disadvantage is brought about, but also other physical properties will be damaged.

(E) Adhesiveness Enhancer

In the present invention, it is a remarkable specific feature to use a compound having 2 or more allyl ester groups in its molecule together with the above-described adhesion imparting agent (D) for the purpose of further enhancing adhesiveness of the cured product. By use of such allyl ester containing compound in combination, adhesion durability can be markedly improved along with self-adhesiveness.

Non-limiting examples of such ally ester containing compounds may include the following compounds.

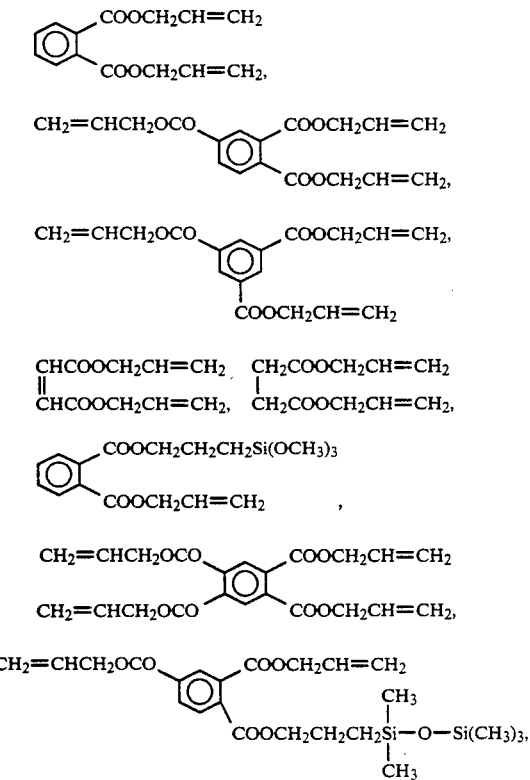

and

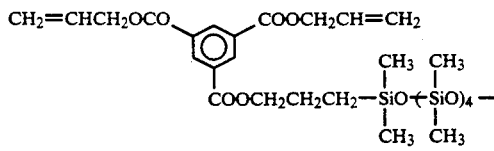

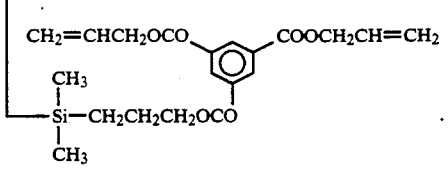

Such an allyl ester containing compound is used in an amount of 0.05 to 5 parts by weight, preferably 0.1 to 3 parts by weight, per 100 parts by weight of the organopolysiloxane of the component (A). If the amount used is less than 0.05 part by weight, it becomes difficult to accomplish the object of the present invention to enhance the characteristics of adhesion durability, etc., while if it is used in a larger amount than 5 parts by weight, not only economical disadvantage is brought about, but also physical properties will be damaged.

Other Formulation Agents

In the composition of the present invention, in addition to the essential components (A)-(E) as described above, depending on its uses, etc., various additives such as fillers, etc. can be added.

For example, as fillers, all of those conventionally used for addition type silicone rubber compositions can be used, including specifically fumed silica, precipitated silica, silica applied with hydrophobicity treatment, carbon black, titanium dioxide, ferric oxide, aluminum oxide, zinc oxide, quarts powder, diatomaceous earth, calcium silicate, talc, bentonite, asbestos, glass fibers, organic fibers, etc. These may be used either singly or as a combination of two or more.

The amount of such fillers formulated is not limited, provided that the object of the present invention is not impaired, but, may be generally used in an amount of 600 parts by weight or less per 100 parts by weight of the organopolysiloxane of the component (A). Among these, fumed silica should be preferably used in an amount of 25 parts by weight or less. In the case of alumina, etc., a range from 300 to 500 parts by weight is preferable. Thus, the preferable amount depends on the oil absorption amount, the surface area, the specific gravity, etc. of the filler.

For reinforcement of the strength of the cured product, an organopolysiloxane having a resinous structure containing $SiO_2$ units, $CH_2=CH-(R')_2SiO_{0.5}$ units and $(R')_3-SiO_{0.5}$ units (where R' is a monovalent hydrocarbon group containing no unsaturated aliphatic group) disclosed in Japanese Patent Publication (KOKOKU) Nos. 26771/1963, 9476/1970, etc. can be also added.

Further, for the purpose of controlling the curing rate of the composition, an organopolysiloxane including $CH_2=CH(R'')SiO$ units (where R'' is the same as the above R') disclosed in Japanese Patent Publication (KOKOKU) No. 10947/1973, an acetylene compound disclosed in U.S. Pat. No. 3,445,420, and an ionic compound of a heavy metal disclosed in U.S. Pat. No. 3,532,649, etc. can be formulated, and also a functionless organosiloxane can be also formulated for enhancing hot impact resistance, flexibility, etc. of the cured product.

Further, if necessary, colorants such as red iron oxide, black iron oxide and cerium oxide, heat resistance enhancers, flame retardants such as carbon, titanium oxide, venzotriazole, zinc carbonates and manganese carbonates, addition reaction retardants such as vinyl group containing siloxanes, acetylene compounds, foaming agents, etc. can be also suitably formulated.

The adhesive composition of the resent invention can be prepared by mixing uniformly the respective components as described above. The composition can be readily cured by heating at, for example, 100° to 180° C. to form a rubbery elastic cured product. The curing time may be generally about 3 to 60 minutes.

EXAMPLES

In the following Examples, all "parts" mean parts by weight and all viscosities have been measured at 25° C.

Example 1

The following components were added and mixed uniformly.

| | |
|---|---|
| Dimethylpolysiloxane (both ends blocked with dimethylvinylsiloxy groups viscosity: 5,000 cSt) | 100 parts |
| Fumed silica (surface made hydrophobic with trimethylsilyl group, specific surface area: 300 m²/g) | 15 parts |
| Octanol solution of chloroplatinic acid (containing 2 wt. % platinum) | 0.02 part |
| 3-Methyl-3-hydroxy-1-butyne (control agent) | 0.005 part |

Further, 2.5 parts of an organohydrogen-polysiloxane represented by the formula shown below, 3.0 parts of an adhesion imparting agent represented by the formula shown below and 0.8 parts of triallyl trimellitate as the ally ester compound were added and mixed to prepare an adhesion composition I.

Organohydrogenpolysiloxane:

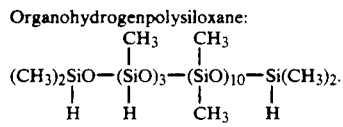

Adhesion imparting agent:

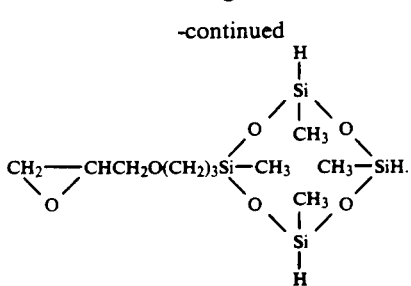

The composition I was cured under the conditions of 120° C./60 min., and then physical properties as rubber of the cured product obtained were measured according to JIS K-6301. Hardness was measured using A-type spring hardness tester as defined in JIS K-6301. Also, adhesive strength under shear with various substrates and their durabilities under dipping in water were measured. The adhesive strength under shear was measured by sandwiching the adhesive composition between substrates to be adhered as shown in FIG. 1 and effecting curing under pressure to prepare a specimen, and measuring the maximum tensile load until broken when a tensile load was applied to the specimen in the direction shown in FIG. 1; the value thus obtained was regarded as the adhesive strength under shear. The measurement results are shown in Table 1.

Example 2

A composition II was prepared in entirely the same manner as in Example 1 except for changing the adhesion imparting agent to one shown below.

Also for the composition II, the same measurements were carried out and the results are shown in Table 1.

Adhesion imparting agent:

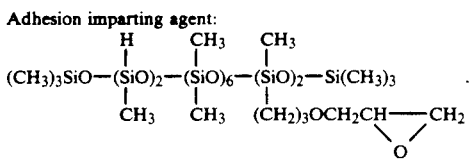

Comparative Examples 1 and 2

Procedures of Examples 1 and 2 were followed, respectively, prepare to comparative composition A and B, except for using no triallyl trimellitate, and the same measurements were conducted. The measurement results are also shown in Table 1.

TABLE 1

| Composition | I | II | A | B |
|---|---|---|---|---|
| Hardness | 35 | 38 | 35 | 38 |
| Elongation (%) | 320 | 340 | 310 | 350 |
| Tensile strength (kgf/cm²) | 31 | 32 | 30 | 31 |

| Adhesion strength under shear (kgf/cm²) | Initial stage | After* aging | Initial stage | After aging | Initial stage | After aging | Initial stage | After aging |
|---|---|---|---|---|---|---|---|---|
| Substrate | | | | | | | | |
| Glass | 11 | 11 | 11 | 11 | 11 | 11 | 12 | 11 |
| Aluminum | 11 | 11 | 12 | 12 | 12 | 3 | 11 | 3 |
| Iron | 12 | 11 | 11 | 10 | 11 | 2 | 12 | 2 |
| Copper | 11 | 10 | 11 | 10 | 8 | peeled off | 10 | peeled of |
| Polyester resin | 11 | 11 | 12 | 11 | 6 | peeled off | 8 | peeled of |
| Epoxy resin | 12 | 11 | 12 | 11 | 10 | peeled off | 10 | peeled of |

TABLE 1-continued

| PBT** | 10 | 10 | 12 | 11 | 2 | peeled off | 2 | peeled of |
|---|---|---|---|---|---|---|---|---|

*"After aging" shows the value measured after dipping in water at 80° C. for 3 days.
**Poly(butylene terephthalate)

EXAMPLE 3

As the principal agent, dimethylpolysiloxane, the two kinds shown below are used.

(a) Dimethylpolysiloxane having $$CH_2=CH-\underset{\underset{CH_3}{|}}{\overset{\overset{CH_3}{|}}{Si}}-$$

at both ends of its molecular chain, and one group of $$-\underset{\underset{CH=CH_2}{|}}{\overset{\overset{CH_3}{|}}{SiO}}-$$

on average in its molecule, and having a viscosity of 30,000 cSt;

(b) Dimethylpolysiloxane having $$CH_2=CH-\underset{\underset{CH_3}{|}}{\overset{\overset{CH_3}{|}}{Si}}-$$

at both ends of its molecular chain, and having a viscosity of 600 cSt.

The following components were added and uniformly mixed.

| | |
|---|---|
| Dimethylpolysiloxane (a) | 50 parts |
| Dimethylpolysiloxane (b) | 50 parts |
| Alumina (average particle size 5 μm) | 300 parts |
| Octanol solution of chloroplatinic acid (the same as in Example 1) | 0.1 part |
| 3-Methyl-3-hydroxy-1-butyne (retardant) | 0.03 part |

Further, 4.4 parts of an organohydrogen-polysiloxane represented by the average composition formula below, 4.0 parts of the same adhesion imparting agent as used in Example 2 and 0.5 part of diallyl maleate as the allyl ester containing compound were added and mixed to prepare an adhesion composition III.

Organohydrogenpolysiloxane:

$$(CH_3)_3SiO-\underset{\underset{H}{|}}{\overset{\overset{CH_3}{|}}{(SiO)}}_{12}-\underset{\underset{CH_3}{|}}{\overset{\overset{CH_3}{|}}{(SiO)}}_{12}-Si(CH_3)_3.$$

The composition III was cured under the conditions of 130° C./30 min., and physical properties as rubber and the adhesion force were measured in the same manner as in Example 1. The results are shown in Table 2.

Comparative Example 3

A comparative composition C was prepared in the same manner as in Example 3 except for using no diallyl maleate. Its physical properties as rubber and adhesion force were measured. The results are shown in Table 2.

TABLE 2

| Composition | III | | C | |
|---|---|---|---|---|
| Hardness | 60 | | 60 | |
| Elongation (%) | 110 | | 90 | |
| Tensile strength (kgf/cm²) | 43 | | 38 | |
| Adhesion strength under shear (kgf/cm²) | Initial stage | After* aging | Initial stage | After aging |
| Substrate | | | | |
| Aluminum | 24 | 18 | 20 | 3 |
| Phenol resin | 25 | 20 | 21 | 18 |
| PBT | 24 | 19 | 22 | Peeded off |

*"After aging" shows the value measured after dipping in engine oil (10 W-30) at 150° C. for 5 days.

Example 4

| | |
|---|---|
| Dimethylpolysiloxane (both ends blocked with trivinylsilyl group, viscosity 30,000 cSt) | 100 parts |
| Quartz powder (average particle size 2μ, specific surface area 1.0 m²/g) | 50 parts |
| Octanol solution of chloroplatinic acid (containing 2 wt. % of platinum) | 0.08 part |
| 3-Methyl-hydroxy-1-butyne | 0.02 part |

The above components were uniformly mixed, and further 2.8 parts of the same organohydrogenpolysiloxane as used in Example 1, 3.0 parts of an adhesion imparting agent represented by the following formula:

$$(CH_3O)_3-Si(CH_2)_2-\underset{\underset{CH_3}{|}}{\overset{\overset{CH_3}{|}}{Si}}-O-\underset{\underset{CH_3}{|}}{\overset{\overset{H}{|}}{(SiO)}}_2-\underset{\underset{CH_3}{|}}{\overset{\overset{CH_3}{|}}{(SiO)}}_7-\overset{\overset{H}{|}}{Si(CH_3)_2}$$

and 1.0 part of an allyl ester group containing compound represented by the formula:

$$CH_2=CHCH_2OCO-\underset{}{\overset{}{\bigcirc}}-\underset{COOCH_2CH_2CH_2\underset{\underset{CH_3}{|}}{\overset{\overset{CH_3}{|}}{Si}}-O-Si(CH_3)_3}{\overset{COOCH_2CH=CH_2}{}}$$

were added and mixed to prepare an adhesion composition IV.

Physical properties were measured in the same manner as in Example 1.

The results are shown in Table 3.

Example 5

An adhesion composition V was prepared in entirely the same manner as in Example 4 except for replacing the allyl ester group containing compound used in Example 4 with 0.6 parts of an ally ester containing compound represented by the formula:

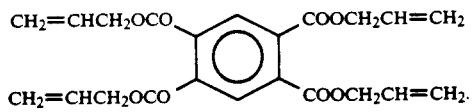

The physical properties of the composition were measured in the same manner as in Example 1. The results are shown in Table 3.

TABLE 3

| Composition | IV | V |
|---|---|---|
| Hardness | 40 | 40 |
| Elongation (%) | 520 | 510 |
| Tensile strength (kgf/cm$^2$) | 24 | 23 |

| Adhesion strength under shear (kgf/cm$^2$) | Initial stage | After* aging | Initial stage | After aging |
|---|---|---|---|---|
| Substrate | | | | |
| Aluminum | 21 | 22 | 19 | 20 |
| PBT | 20 | 20 | 18 | 17 |

*"After aging" means that the specimen was subjected to Pressure cooker test under the conditions of a pressure of 2.0 kgf/cm$^2$ for 24 hours before measurement.

We claim:

1. An adhesive organopolysiloxane composition comprising:
   (A) 100 parts by weight of an organopolysiloxane having at least two alkenyl group in its molecule and a viscosity at 25° C. of 100 to 200,000 cSt,;
   (B) an organohydrogenpolysiloxane having two or more silicon-bonded hydrogen atoms in its molecule in such an amount as to supply 0.6 to 6.0 silicon-bonded hydrogen atoms per alkenyl group of said (A) organopolysiloxane;
   (C) a catalytic amount of a platinum catalyst;
   (D) 0.5 to 20 parts by weight of an adhesion imparting agent comprising at least one compound selected from the group consisting of compounds of the formulas:

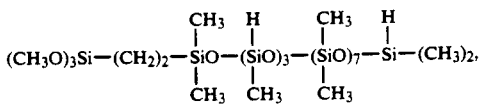

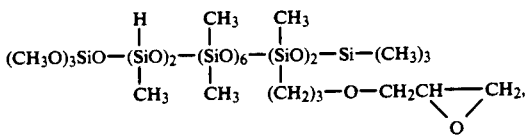

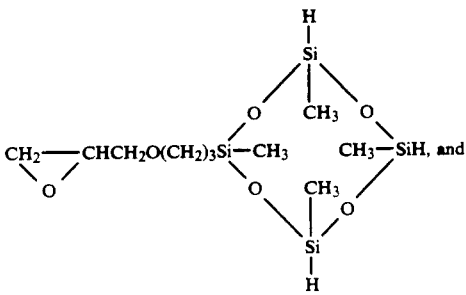

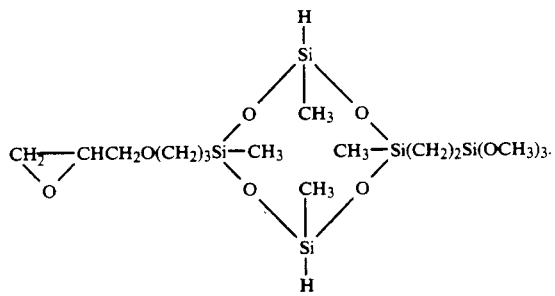

and
   (E) 0.05 to 5 parts by weight of a compound containing two or more allyl ester groups in its molecule.

* * * * *